United States Patent Office 3,801,697
Patented Apr. 2, 1974

3,801,697
PROCESS FOR REDUCING THE CONTENT OF NITROGEN OXIDES IN THE EXHAUST GASES FROM INTERNAL COMBUSTION ENGINES
Thaddeus P. Kobylinski, Cheswick, and Brian W. Taylor, Richland Township, Pa., assignors to Gulf Research & Development Company, Pittsburgh, Pa.
No Drawing. Filed Mar. 2, 1972, Ser. No. 231,425
Int. Cl. B01d 53/34
U.S. Cl. 423—213.7                         20 Claims

ABSTRACT OF THE DISCLOSURE

A method is proposed for the reduction of nitrogen oxides in exhaust gases from internal combustion engines to selectively form nitrogen as substantially the only nitrogen-containing product. The method comprises contacting an exhaust gas from an internal combustion engine at an elevated temperature in a reducing atmosphere with rhodium and ruthenium.

---

This invention relates to the selective removal of nitrogen oxides in the exhaust gases from internal combustion engines. In particular, this invention relates to the selective removal of nitrogen oxides in the exhaust gases from internal combustion engines, without the formation of significant amounts of ammonia, using rhodium and ruthenium as the catalyst therefor.

Considerable research effort has been expended over the past several years to discover means for the removal of nitrogen oxides in the exhaust gases from internal combustion engines. Nitrogen oxides constitute an undesirable air pollutant, but the removal of these nitrogen oxides, i.e., NO and $NO_2$, has proven to be a much more difficult problem than first anticipated. These problems and some of the solutions tried are described in the Paper "$NO_x$ Reduction Catalysts For Vehicle Emission Control" by G. H. Meguerian and C. R. Lange, published by the Society of Automotive Engineers, Inc. and presented as a part of the Automotive Engineering Congress Meeting in Detroit, Michigan on Jan. 11–15, 1971. The problem is complicated by the fact that while several catalytic materials are available to convert nitrogen oxides (which are present in low concentrations in the exhaust gases from internal combustion engines) very rapidly to acceptable inert materials, such as nitrogen, most of these catalysts are active only when pure reducing agents, such as carbon monoxide, are used in an anhydrous environment. Examples of these types of materials are the transition metal oxides, which are easily poisoned by trace amounts of water. It is obvious these catalytic materials are unacceptable for use in an automobile exhaust converter, since the automobile exhaust gases contain up to 16 percent water.

Noble metals, such as platinum and palladium, retain their activity for the reduction of nitrogen oxides in the presence of water; however, hydrogen as a reducing agent using platinum or palladium as the reduction catalyst proved totally unacceptable, since hydrogen was found to react with the nitrogen oxides to produce substantial amounts of unwanted ammonia. The use of carbon monoxide as a reducing agent was also found undesirable, since it reacted with water over the platinum or palladium catalyst by the well-known water gas shift reaction to give hydrogen and $CO_2$. The hydrogen would then, in turn, react preferentially with the nitrogen oxides to give ammonia. Ammonia is not only a pollutant per se, but additionally, the ammonia, if present, would be reoxidized back to the undesirable nitrogen oxides in a second-stage reaction chamber, which would be normally employed to oxidize any unburned hydrocarbons or carbon monoxide in the exhaust gases to form $CO_2$ and water. As a consequence, the desired amount of nitrogen oxide removal could not be achieved. It was, of course, not possible to add the oxidizing gas to the first stage, since the platinum and palladium catalysts do not function to reduce NO in the presence of a predominating oxidizing atmosphere.

We have found that substantially all of the nitrogen oxides in exhaust gases from internal combustion engines can be selectively reduced to form nitrogen as substantially the only nitrogen-containing compound, without formation of significant amounts of ammonia, by a process which comprises passing said exhaust gas at elevated temperatures in a reducing atmosphere into contact with a catalyst bed containing rhodium and ruthenium. By "substantially all of the nitrogen oxides" we mean that at least about 75 mol percent of the nitrogen oxides are converted herein, preferably at least about 85 mol percent are converted, but most preferably at least about 90 mol percent are converted.

The gas mixtures of interest for treatment in accordance with the process of this invention are those gas mixtures produced by the combustion of a hydrocarbon fuel using air, such as the exhaust gases from an internal combustion engine utilizing a hydrocarbon type fuel. By "an internal combustion engine" we mean to include an engine having a combustion chamber wherein a hydrocarbon fuel is burned with molecular oxygen and the products of combustion are used to drive moving parts, such as a piston, rotors, etc. These hydrocarbon fuel exhaust gases contain small concentrations of NO and $NO_2$ where usually the mol ratio of NO to $NO_2$ exceeds 1:1.

An automobile exhaust gas that can be treated in accordance with the process defined and claimed herein would have a composition whose major components would be as shown in Table I below:

TABLE I

| Components | Broad range | Usual range |
|---|---|---|
| (1).... $NO_x$, where $x$ is 1 or 2, p.p.m.[2].... | 50 to 5,000..... | 100 to 3,500. |
| (2).... Free molecular oxygen, mol percent. | 0 to 5............ | 0.5 to 2. |
| (3).... Free molecular hydrogen, mol percent. | 0.1 to 4......... | 0.2 to 1. |
| (4).... CO, mol percent................. | 0.2 to 8......... | 0.4 to 2. |
| (5).... Hydrocarbons,[1] p.p.m.[2].......... | 0 to 4,000...... | 50 to 1,000. |
| (6).... $H_2O$, mol percent................. | 5 to 16.......... | 10 to 13. |
| (7).... $CO_2$, mol percent................ | ......do......... | Do. |
| (8).... Lead (as metal), p.p.m.[2]......... | 0 to 12.......... | 0 to 4. |
| (9).... Nitrogen, mol percent............ | 53 to 89......... | 68 to 78. |

[1] Calculated as carbon.
[2] By volume.

In our copending application Ser. 231,356, entitled Process for Reducing the Content of Nitrogen Oxides in the Exhaust Gases From Internal Combustion Engines, filed concurrently herewith, we have claimed a process for the reduction of substantially all of the nitrogen oxides in exhaust gases from internal combustion engines to selectively form nitrogen as substantially the only nitrogen-containing compound which comprises contacting said exhaust gas in a reducing atmosphere with rhodium. Although the claimed process is effective as described, temperatures of at least about 800° F. are required during the process to obtain a product substantially free of ammonia. We have found, however, that if the catalyst used contains not only rhodium but also ruthenium effective reduction of nitrogen oxides without the formation of significant amounts of ammonia can occur at lower temperatures, that is, at temperatures as low as about 700° F. In addition, we have found that when rhodium and ruthenium are used herein and ruthenium is employed as a replacement for rhodium, the total amount of catalyst used is appreciably less than when rhodium alone is used. This is totally unexpected even though we have disclosed in our copending application Ser. No. 207,545, filed Dec. 13, 1971, entitled Process for Reducing the Content of Nitrogen Oxides in the Exhaust Gases From Internal Combustion Engines, that ruthenium is an effective catalyst for the reduction of substantially all of the nitrogen oxides in exhaust gases from internal combustion engines to selectively form nitrogen as substantially the only nitrogen-containing compound and to obtain a product substantially free of ammonia.

The catalysts must be employed herein in effective catalytic amounts. Thus, the amount of rhodium in the reaction must be in the range of about 0.0001 to about 0.5, preferably in the range of about 0.0005 to about 0.3, troy ounce per 1000 cubic feet of exhaust gas being treated per hour, while the amount of ruthenium in the reaction zone must be in the range of about 0.0001 to about 0.5, preferably in the range of about 0.0005 to about 0.3, troy ounce per 1000 cubic feet of exhaust gas being treated per hour. This is so because when in amounts in excess thereof are employed the water gas shift reaction between carbon monoxide and water is facilitated, resulting in the formation of relatively large amounts of hydrogen. With the presence of this additional hydrogen in the reaction zone, the reaction between the nitrogen oxides and hydrogen would also be facilitated and there would be a tendency to form unacceptably large amounts of ammonia. On the other hand, in order to convert substantially all of the nitrogen oxides the combined total of rhodium and ruthenium should be at least about 0.0003 troy ounce per 1000 cubic feet of exhaust gas being treated per hour, preferably at least about 0.001 troy ounce per 1000 cubic feet of exhaust gas being treated per hour. The weight ratio of rhodium to ruthenium will be on the order of about 15:1 to about 1:100, preferably about 10:1 to about 1:50. By "troy ounce" of a metal we mean 31.1 grams of said metal.

The catalysts used herein can be unsupported and in substantially pure form but in a preferred embodiment they are suitably distended on a support. The amount of combined catalyst, calculated as metal, on the support can suitably be, for example, from about 0.01 to about 10 weight percent of the support, but is usually and preferably from about 0.05 to about one weight percent of the support.

The support for the catalysts to be used in the process of this invention can be any of the refractory oxide supports well-known in the art, such as those prepared from alumina, silica, magnesia, thoria, titania, zirconia, silica-aluminas, silica-zirconias, magnesia-aluminas, etc. In addition, the support can be an activated carbon, pumice, etc. Other suitable supports include the naturally-occurring clays, such as diatomaceous earth. In general, the surface area of these supports can be from about 10 m.$^2$ to about 500 m.$^2$ per gram, preferably from about 50 m.$^2$ to about 300 m.$^2$ per gram. Additional desirable supports for use herein are the more-recently developed corrugated ceramic materials made, for example, from alumina, silica and magnesia, lithium, etc. An example of such ceramic material is Therma Comb made by American Lava Corporation, Chattanooga, Tennessee, which is more fully described in U.S. Pat. No. 3,444,925. If desired, the metals can be mounted directly onto the surface of the ceramic material, the ceramic material can first be coated with a refractory oxide, such as defined above, prior to the deposition of the metals thereon or the metals can be combined with the refractory oxide and the resultant combination can then be deposited on the ceramic material. The ceramic materials per se have a low surface area and high heat stability, and the addition of the refractory oxide coating increases the surface area to a more desirable range. In addition, these coated ceramics possess the further advantage of being easily formed in one piece. Very little, if any, pressure drop is experienced by the passage of exhaust gases through such ceramic materials.

Any suitable method well-known to those having ordinary skill in the art can be employed in the preparation of the supported catalysts used herein. For example, the rhodium and ruthenium can de deposited on a support by contacting the support with an aqueous solution of rhodium chloride and ruthenium chloride at room temperature and room pressure for a suitable period of time, for example, about six hours. The catalyst can then be dried and calcined in the usual manner, for example, dried for six hours at 200° F. and then calcined for 12 hours at a temperature of about 700° to about 1000° F., after which it is ready for use in the process defined herein. Alternatively, the catalyst can be dried and reduced, for example, in a hydrogen atmosphere at an elevated temperature on the order of about 700° to about 1000° F. It is difficult to categorize the form in which the metals fined themselves on the support. Because of the high temperatures involved in their preparation and in their use as catalysts herein, it is likely that some alloying (solution of one metal in another) takes place, but it is also believed that some admixture of the two also results. In any event, regardless of the association in which the metals are found, they are effective herein for the stated purpose of converting substantially all of the nitrogen oxides to nitrogen without the formation of appreciable amounts of ammonia. Some of the rhodium and ruthenium on these supports can be present as a chemical compound, for example, as rhodium oxide or ruthenium oxide, or some can be chemically and/or physically bonded to the surface of the support, for example, with an alumina base a chemical bond may exist between the surface oxide ions and the rhodium or ruthenium, but, in general, it is believed most of the rhodium and ruthenium is present in its elemental form.

The reaction conditions which are employed in the selective reduction of a nitrogen oxide using the ruthenium catalyst of this invention are important in order to obtain a product wherein nitrogen is substantially the only nitrogen-containing product. By the statement that nitrogen is substantially the only nitrogen-containing product is meant that little or no ammonia is formed during the reduction despite the fact that the reduction occurs in the presence of hydrogen. In general, by following the procedure defined herein no more than about seven weight percent of the nitrogen oxides in the exhaust gas are converted to ammonia, but in most instances less than about three weight percent are converted to ammonia. It has been found that in order to selectively reduce the nitrogen oxides in the presence of hydrogen while producing substantially no ammonia, the conditions in the reaction zone should be a temperature of about 680° to about 1800° F., or even higher, preferably about 750° to about 1500° F. By operating the process as defined herein substantially all of the nitrogen oxides are converted to nitrogen and water and only a small amount thereof is converted to ammonia.

The reaction pressure is not critical and suitable pressures are from 0 to 150 pounds per square inch gauge, with the preferred pressure being atmospheric or slightly above. It has also been found that the catalysts used herein are effective at both low and high gas hourly space velocities (GHSV), i.e., at 8,000 to about 200,000, or even higher, volumes of gas per hour per volume of catalyst. In general, we prefer to operate at space velocities of about 10,000 to about 90,000. Here, as elsewhere in this specification, volumes are defined as being at standard conditions, that is, 760 mm. Hg and ° C. In general, during idling an internal combustion engine, particularly of the automotive type, can produce as low as about 600 cubic feet per hour of exhaust gas and at extremely high speeds, for example, at speeds in excess of about 60 miles per hour, can produce as high as about 12,000 cubic feet per hour of exhaust gas, but in general from about 1500 to about 8000 cubic feet per hour of exhaust gas will be produced at speeds below about 60 miles per hour. An additional critical requirement herein is to maintain an effective reducing atmosphere in the reaction zone. By "reducing atmosphere" we mean an atmosphere wherein the stoichiometric ratio of molecular oxygen to the reducing agents in the reaction zone is less than 1:1, preferably about 0.9:1 or less. By "stoichiometric ratio of molecular oxygen to the reducing agents" we mean the amount of oxygen stoichiometrically required to convert the reducing agent or agents to their higher oxidation states. By "reducing agent" we mean to include substances which can be oxidized in the reaction zone by molecular oxygen, for example, substances such as hydrogen and carbon monoxide which can be converted to water and carbon dioxide, respectively.

The catalyst defined herein is, of course, primarily meant to be utilized as part of a reactor system to be attached at any suitable location in the exhaust system of an automobile. The temperature of the reactor system can suitably be regulated to the desired temperature by the position of the reactor with respect to the gases exiting from the internal combustion engine. The further from the engine the reactor is placed, the cooler will be the gases entering the reactor. It may also be desirable to utilize some of the exhaust gases initially to preheat the reactor catalyst chamber before the gases enter into the catalyst chamber. A suitable means of doing this could be that disclosed in the Meguerian-Lange paper mentioned earlier.

It is also important with automotive exhaust gases to not only remove nitrogen oxides but also to remove unburned hydrocarbons and carbon monoxide. The removal of the unburned hydrocarbons and carbon monoxide can easily be achieved by subjecting the exhaust gases after treatment with the catalysts defined herein to an oxidation reaction using known catalysts under known oxidizing conditions. This oxidation must occur, however, in the substantial absence of ammonia, since ammonia will quickly reoxidize to form undesirable nitrogen oxides. By the use of the catalyst defined herein, utilizing the conditions as set forth herein, to obtain a product having substantially no ammonia, the product gases can then be oxidized in a second-stage converter utilizing oxidation catalysts, which are well-known in the art, under oxidation conditions to oxidize any unburned hydrocarbons and carbon monoxide to non-polluting gases such as carbon dioxide and water. Usually combustion air is pressurized into the $NO_x$-free gases at a flow rate such that the average temperature of the catalyst bed is maintained at a level from about 800° to about 1700° F., preferably a temperature of 900° to 1100° F. Any of the metals of Group VIII, for example, platinum, palladium, ruthenium, etc., can successfully be employed in the oxidation of unburned hydrocarbons and CO to produce $CO_2$ and water in the presence of a combustion gas, such as air. In addition, copper, vanadium or chromium-containing catalysts can also be used. These metals are usually distended on a support which can be the same as the supports described above for use with the rhodium and ruthenium catalyst. Other typical oxidation catalysts, conditions and operational procedure can be the same as described in U.S. Pat. No. 3,503,715 to Haensel and the teachings of this patent are incorporated herein by reference. Still another procedure for the oxidation of unburned hydrocarbons and CO with molecular oxygen in the presence of oxidation catalysts is claimed in U.S. Pat. No. 3,257,163 to Stiles.

The invention will be further described with reference to the following experimental work.

Experiments were conducted with rhodium alone or rhodium in combination with ruthenium supported on alumina spheres having a density of 0.5 gram/cc. for the reduction of nitrogen oxides in the presence of $H_2$. The one-sixteenth diameter alumina spheres have the following characteristics: 190 m.²/gram surface area; 0.82 cc./gram pore volume, and an average pore diameter of 185Å. Rhodium alone was added to the alumina spheres by contacting them with an aqueous solution of rhodium chloride at atmospheric temperature and atmospheric pressure. When rhodium and ruthenium were added to the alumina spheres an aqueous solution of rhodium chloride and ruthenium chloride was used. The catalysts were then dried at a temperature of 250° F. for six hours and the catalysts then calcined at 900° F. for six hours.

A first series of runs was made by passing a synthetic gaseous mixture over each of three catalyst beds at 30,000 GHSV. The synthetic gaseous mixture contained 0.15 mol percent NO, 1.4 mol percent carbon monoxide, 0.8 mol percent hydrogen, 11.0 mol percent carbon dioxide, 9.0 mol percent water, 0.3 mol percent oxygen and 77.35 mol percent argon. The catalyst beds contained, respectively, 1.0, 0.3 and 0.1 weight percent rhodium. Under these conditions the Troy ounce of rhodium used per 1000 cubic feet of exhaust gas treated was 0.15, 0.045 and 0.015, respectively. The amount of metal in the examples in the specification was determined in accordance with the following equation:

$$\frac{\text{Weight percent metal on support} \times 1000}{GHSV \times \text{factor}}$$

wherein the factor is determined in accordance with the following equation:

$$\frac{31.1}{\text{Density of catalyst} \times 10 \times 28.31}$$

the number 31.1 being the number of grams in one troy ounce, 28.31 being the number of liters in one cubic foot of gas, the GHSV is expressed in liters of gas per liter of catalyst per hour, and the density is defined in grams/cc³. One hundred mol percent conversion of the nitrogen oxides was obtained. The results are tabulated below in Table I.

TABLE I

| Exp. No. | Temp., °F. | Weight percent NO converted to ammonia using— | | |
|---|---|---|---|---|
| | | 1.0 weight percent rhodium | 0.3 weight percent rhodium | 0.1 weight percent rhodium |
| 1 | 400 | 28.0 | 27.5 | 28.0 |
| 2 | 650 | 20.5 | 20.0 | 20.0 |
| 3 | 760 | 12.5 | 12.0 | 12.0 |
| 4 | 850 | 6.0 | 6.0 | 6.5 |
| 5 | 950 | 0.5 | 1.0 | 1.0 |

The above data show that a temperature of at least about 800° F. is required to convert nitrogen oxides to a product substantially free of ammonia using rhodium as catalyst therefor, even when the amount of rhodium used is in relatively large amounts.

An additional series of experiments was carried out as in Table I but wherein the catalyst contained 0.3 weight percent rhodium and 0.3 weight percent ruthenium. At the stated space velocity of 30,000, each metal was present in the amount of 0.045 troy ounce per 1000 cubic feet of gas being treated per hour. Again 100 molar percent conversion of NO was obtained. The results obtained are tabulated below in Table II.

TABLE II

| Exp. No. | GHSV | Temp., °F. | Weight percent NO converted to ammonia |
|---|---|---|---|
| 6 | 30,000 | 450 | 18.0 |
| 7 | 30,000 | 650 | 12.5 |
| 8 | 35,000 | 750 | 5.5 |
| 9 | 30,000 | 860 | 3.1 |
| 10 | 30,000 | 970 | 0.8 |
| 11 | 60,000 | 860 | 3.0 |
| 12 | 90,000 | 980 | 0.5 |

From Table II it can be seen that with the presence of ruthenium, rhodium is especially effective in the reduction of nitrogen oxides without the formation of significant amounts of ammonia at temperatures as low as about 700° F. and that this is true even at extremely high space velocities.

Still another series of experiments was carried out as in Table II wherein the amounts of rhodium and ruthenium present on the catalyst surface were varied at selected temperature levels. As before 100 molar percent conversion of NO was obtained. The results are tabulated below in Table III.

only as a reducing catalyst but also as an oxidation catalyst during the initial stages of operation as described above. Temperature sufficient for oxidation during the initial stage of operation can be in the range of about 350° to about 1500° F., preferably from about 450° to about 1200° F.

TABLE III

| Exp. No. | Catalyst | Weight percent of catalysts | GHSV | Troy ounce of metals per 1,000 cubic feet of gas | Temp., °F. | Weight percent NO converted to ammonia |
|---|---|---|---|---|---|---|
| 13 | Rhodium/ruthenium | 0.5/0.5 | 30,000 | 0.07/0.07 | 850 | 1.8 |
| 14 | do | 0.5/0.1 | 30,000 | 0.07/0.015 | 850 | 2.8 |
| 15 | do | 0.3/0.3 | 30,000 | 0.04/0.04 | 850 | 1.7 |
| 16 | do | 0.3/0.06 | 30,000 | 0.04/0.009 | 850 | 2.9 |
| 17 | do | 0.1/0.1 | 30,000 | 0.01/0.01 | 850 | 2.4 |
| 18 | do | 0.1/0.05 | 30,000 | 0.01/0.007 | 850 | 3.1 |
| 19 | do | 0.3/0.3 | 30,000 | 0.04/0.04 | 750 | 5.2 |
| 20 | do | 0.3/0.06 | 30,000 | 0.04/0.009 | 750 | 5.8 |
| 21 | do | 0.1/0.05 | 30,000 | 0.01/0.007 | 750 | 5.6 |
| 22 | do | 0.3/0.3 | 85,000 | 0.01/0.01 | 850 | 2.6 |
| 23 | do | 0.3/0.3 | 85,000 | 0.01/0.01 | 850 | 2.8 |

The data in Table III are indicative of the unexpected results obtained herein as a result of the use of rhodium and ruthenium in the reduction of nitrogen oxides in the exhaust gases from an internal combustion engine. For example, in Experiment No. 4 when 1.0 weight percent rhodium was used at a GHSV of 30,000 successful operation was obtained. In Experiment No. 13 when the same total amount of catalyst was used but one-half of the rhodium was replaced with the same amount of ruthenium, only 1.8 weight percent of NO was converted to ammonia. In Experiment No. 14 only one-fifth the amount of ruthenium used in Experiment No. 13 was employed and yet only 2.8 weight percent of NO was converted to ammonia, about the same as in Experiment No. 13 and less than in Experiment No. 4 wherein a greater total amount of catalyst was used. The use of less total catalyst, with reduced amounts of ruthenium, and at elevated space velocities, is further shown in Experiments Nos. 15 to 23.

As pointed out above, in the system defined herein an auto exhaust gas is first contacted with rhodium and ruthenium under reducing conditions to convert nitrogen oxides to nitrogen and then in a second stage is contacted with oxidation catalyst, such as, platinum, under oxidation conditions to convert unburned hydrocarbons and carbon monoxide to carbon dioxide and water. Since the second stage is further removed from the engine than the first, it will reach operative temperature levels later than the first. Accordingly, during the initial stages of operation, for example, from about 20 seconds to about two minutes after start-up, unburned hydrocarbons and carbon monoxide will not be satisfactorily oxidized in the second stage until adequate oxidation temperature levels are reached therein.

Utilization of the first stage reactor for oxidation during the initial stage of operation can provide a satisfactory solution to the problem. Thus, for example, during the initial stages of operation, oxygen can be introduced into the first stage in amounts sufficient to create an oxidation atmosphere therein so that oxidation of unburned hydrocarbons and carbon monoxide takes place in the presence of rhodium and ruthenium. Since operation of the engine during the initial stages is under closed choke with a rich fuel mixture, nitrogen oxide emissions are low and no urgency exists to convert whatever nitrogen oxides are produced to nitrogen. After initial operation, the temperature in the second stage will quickly reach oxidation temperature levels. Then the oxygen flow is terminated to the first stage reactor but is made to the second stage reactor. Thereafter reducing conditions are maintained in the first stage and oxidation in the second, and each stage functions in the manner previously described above.

An outstanding, and unexpected advantage, of the process defined herein is that when the catalyst in the first stage is rhodium and ruthenium the same functions not Although we have shown in the specific examples herein that effective results are obtained with a catalyst containing ruthenium and rhodium, it is within the scope of our invention to use not only these metals alone but also in combination with other materials, for example, promoters, such as potassium, sodium, calcium, barium, magnesium, lithium, rubidium, cesium, strontium and thallium; metals, such as platinum, palladium, cobalt, nickel, iron, manganese, rhenium, chromium, molybdenum, tellurium, tungsten, vanadium, niobium, antimony, tantulum, bismuth, titanium, zirconium, zinc, cadmium, copper and uranium, etc., provided the amount of ruthenium and rhodium are within the critical limits defined herein.

Resort may be had to such variations and modifications as fall within the spirit of the invention and the scope of the appended claims.

We claim:

1. A process for the reduction of substantially all of the nitrogen oxides in exhaust gases from internal combustion engines to selectively form nitrogen as substantially the only nitrogen-containing compound which comprises contacting said exhaust gas at an elevated temperature of at least about 680° F. in a reducing atmosphere with about 0.0001 to about 0.5 troy ounce of rhodium and about 0.0001 to about 0.5 troy ounce of ruthenium per 1000 cubic feet of exhaust gas per hour.

2. The process of claim 1 wherein the amount of rhodium is in the range of about 0.0005 to about 0.3 troy ounce and the amount of ruthenium is in the range of about 0.0005 to about 0.3 troy ounce.

3. The process of claim 1 wherein the weight ratio of rhodium to ruthenium is in the range of about 15:1 to about 1:100.

4. The process of claim 1 wherein the weight ratio of rhodium to ruthenium is in the range of about 10:1 to about 1:50.

5. The process of claim 1 wherein said elevated temperature is in the range of about 680° to about 1800° F.

6. The process of claim 1 wherein said elevated temperature is in the range of about 750° to about 1500° F.

7. The process of claim 1 wherein the metals are on a support.

8. The process of claim 1 wherein the metals are on a support selected from the group consisting of alumina, silica, magnesia, thoria, titania, zirconia or mixtures thereof.

9. The process of claim 1 wherein the metals are supported directly on ceramic base or on a ceramic base carrying a refractory oxide.

10. The process of claim 1 wherein the metals are on a support and the exhaust gas is passed through the reaction zone at a gas hourly space velocity of about 8,000 to about 200,000.

11. The process of claim 1 wherein the metals are on a support and the exhaust gas is passed through the reaction zone at a gas hourly space velocity of about 10,000 to about 90,000.

12. The process of claim 1 wherein the metals are on a support in an amount of about 0.01 to about 10 weight percent.

13. The process of claim 1 wherein the metals are on a support in an amount of about 0.05 to about 1.0 weight percent.

14. The process of claim 1 wherein the exhaust being treated contains the following components:

| Components: | Range, mol percent |
|---|---|
| $NO_x$ where $x$ is 1 or 2 (p.p.m. by volume) | 50 to 5000 |
| Free molecular oxygen | 0 to 5 |
| Free molecular hydrogen | 0.1 to 4 |
| CO | 0.2 to 8 |
| Hydrocarbons (p.p.m. by volume) | 0 to 4000 |
| $H_2O$ | 5 to 16 |
| $CO_2$ | 5 to 16 |
| Lead (as metal) (p.p.m. by volume) | 0 to 12 |
| Nitrogen | 53 to 89 |

15. The process of claim 1 wherein the exhaust being treated contains the following components:

| Components: | Range, mol percent |
|---|---|
| $NO_x$ where $x$ is 1 or 2 (p.p.m. by volume) | 100 to 3500 |
| Free molecular oxygen | 0.5 to 2 |
| Free molecular hydrogen | 0.2 to 1 |
| CO | 0.4 to 2 |
| Hydrocarbons (p.p.m. by volume) | 50 to 1000 |
| $H_2O$ | 10 to 13 |
| $CO_2$ | 10 to 13 |
| Lead (as metal) (p.p.m. by volume) | 0 to 4 |
| Nitrogen | 68 to 78 |

16. The process of claim 1 wherein the treated gases are further reacted in a second stage oxidation reactor in the presence of an added gas containing free molecular oxygen to oxidize any hydrocarbons or carbon monoxide therein to a product comprising $CO_2$ and water.

17. The process of claim 15 wherein said oxidation is carried out in the presence of a Group VIII metal.

18. The process of claim 1 wherein the combined total of metals is present in an amount ranging from about 0.0003 to about 0.5 troy once per 1000 cubic feet of exhaust gas per hour.

19. The process of claim 1 wherein the combined total of metals is present in an amount ranging from about 0.001 to about 0.2 troy ounce per 1000 cubic feet of exhaust gas per hour.

20. The process of claim 1 wherein during the initial stages of operation prior to reduction oxygen is introduced into the reaction zone sufficient to create an oxidation atmosphere therein.

References Cited
UNITED STATES PATENTS

| | | | |
|---|---|---|---|
| 3,637,344 | 1/1971 | Thompson | 423—214 |
| 3,118,727 | 1/1964 | Cohn | 423—239 |
| 3,230,034 | 1/1966 | Stiles | 423—213 |
| 3,662,540 | 5/1972 | Murphy | 60—289 X |
| 3,257,163 | 6/1966 | Stiles | 423—213 |
| 3,492,098 | 1/1970 | De Palma et al. | 23—288 F |
| 3,397,034 | 8/1968 | Tulleners et al. | 423—214 |
| 2,601,221 | 6/1952 | Rosenblatt et al. | 423—351 |

GEORGE O. PETERS, Primary Examiner

U.S. Cl. X.R.

60—301; 423—239